(12) United States Patent
Tyler (10) Patent No.: US 10,864,715 B2
(45) Date of Patent: Dec. 15, 2020

(54) ADDITIVE MANUFACTURING SYSTEM HAVING MULTI-CHANNEL NOZZLE

(71) Applicant: CC3D LLC, Coeur d'Alene, ID (US)

(72) Inventor: Kenneth Lyle Tyler, Coeur d'Alene, ID (US)

(73) Assignee: Continuous Composites Inc., Coeur d'Alene, ID (US)

( * ) Notice: Subject to any disclaimer, the term of this patent is extended or adjusted under 35 U.S.C. 154(b) by 622 days.

(21) Appl. No.: 15/623,529

(22) Filed: Jun. 15, 2017

(65) Prior Publication Data

US 2018/0065318 A1    Mar. 8, 2018

Related U.S. Application Data

(60) Provisional application No. 62/383,801, filed on Sep. 6, 2016.

(51) Int. Cl.
*B29C 64/209* (2017.01)
*B33Y 10/00* (2015.01)
(Continued)

(52) U.S. Cl.
CPC .......... *B33Y 10/00* (2014.12); *B29C 35/0805* (2013.01); *B29C 48/05* (2019.02);
(Continued)

(58) Field of Classification Search
CPC ... B29C 64/205; B29C 64/209; B29C 64/314; B29C 64/321; B29C 64/336;
(Continued)

(56) References Cited

U.S. PATENT DOCUMENTS 3,286,305 A    11/1966    Seckel
3,809,514 A     5/1974    Nunez
(Continued)

FOREIGN PATENT DOCUMENTS

DE    4102257 A1    7/1992
EP    2589481 B1    1/2016
(Continued)

OTHER PUBLICATIONS

"Knowledge." Wuxi Jinfan Drilling Equipment Company Ltd. (JINFAN), Jiangyin Lutong Industrial Co.,Ltd., Apr. 19, 2016, www.lutong-industrial.com/index.php?ac=article&at=read&did=110 &p.=2. (Year: 2016).*
(Continued)

*Primary Examiner* — Robert C Dye
*Assistant Examiner* — Taryn Trace Willett
(74) *Attorney, Agent, or Firm* — Ryan Stockett (57) ABSTRACT

A system is disclosed for use in additively manufacturing a composite structure. The system may include a matrix reservoir, and a fiber guide configured to separately receive a plurality of matrix-wetted reinforcements from the matrix reservoir. The system may also include a die configured to receive the plurality of matrix-wetted reinforcements from the fiber guide and to cause the plurality of matrix-wetted reinforcements to converge into a ribbon. The system may additionally include a cure enhancer configured to cure the matrix in the composite material during discharge of the ribbon from the die, and a support configured to move the die in multiple dimensions during discharge of the ribbon.

17 Claims, 3 Drawing Sheets

(51) Int. Cl.
*B29C 48/154* (2019.01)
*B29C 64/264* (2017.01)
*B29C 48/255* (2019.01)
*B29C 64/106* (2017.01)
*B29C 48/25* (2019.01)
*B29C 48/30* (2019.01)
*B29C 48/05* (2019.01)
*B29C 48/08* (2019.01)
*B29C 48/12* (2019.01)
*B33Y 30/00* (2015.01)
*B33Y 50/02* (2015.01)
*B29C 35/08* (2006.01)
*B29C 64/188* (2017.01)
*B29K 105/00* (2006.01)
*B29K 105/08* (2006.01)
*B05D 1/26* (2006.01)
*D03D 15/12* (2006.01)
*B33Y 70/00* (2020.01)

(52) U.S. Cl.
CPC ............ *B29C 48/08* (2019.02); *B29C 48/12* (2019.02); *B29C 48/154* (2019.02); *B29C 48/2556* (2019.02); *B29C 48/266* (2019.02); *B29C 48/301* (2019.02); *B29C 64/106* (2017.08); *B29C 64/209* (2017.08); *B29C 64/264* (2017.08); *B33Y 30/00* (2014.12); *B33Y 50/02* (2014.12); *B05D 1/26* (2013.01); *B29C 48/304* (2019.02); *B29C 64/188* (2017.08); *B29C 2035/0827* (2013.01); *B29K 2105/0058* (2013.01); *B29K 2105/08* (2013.01); *B33Y 70/00* (2014.12); *D03D 15/12* (2013.01)

(58) Field of Classification Search
CPC ............ B29C 64/343; B29C 33/0066; B29C 33/0077; B29C 33/20; B29C 33/424
See application file for complete search history.

(56) References Cited

U.S. PATENT DOCUMENTS

| | | | |
|---|---|---|---|
| 3,984,271 A | 10/1976 | Gilbu | |
| 3,993,726 A * | 11/1976 | Moyer | B29B 15/122 264/171.12 |
| 4,643,940 A | 2/1987 | Shaw et al. | |
| 4,671,761 A * | 6/1987 | Adrian | B29C 48/30 425/501 |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 6,153,034 A | 11/2000 | Lipsker | |
| 6,214,279 B1 * | 4/2001 | Yang | B29C 41/52 264/482 |
| 6,459,069 B1 * | 10/2002 | Rabinovich | B22F 3/005 219/121.63 |
| 6,501,554 B1 | 12/2002 | Hackney et al. | |
| 6,803,003 B2 | 10/2004 | Rigali et al. | |
| 6,934,600 B2 | 8/2005 | Jang et al. | |
| 7,795,349 B2 | 9/2010 | Bredt et al. | |
| 8,221,669 B2 | 7/2012 | Batchelder et al. | |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 * | 10/2015 | Mark | B29C 70/20 |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 * | 10/2017 | Witzel | B29C 70/388 |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0236588 A1 | 12/2003 | Jang et al. | |
| 2005/0006803 A1 | 1/2005 | Owens | |
| 2005/0061422 A1 | 3/2005 | Martin | |
| 2005/0104257 A1 * | 5/2005 | Gu | B29C 41/36 264/401 |
| 2005/0109451 A1 | 5/2005 | Hauber et al. | |
| 2005/0230029 A1 | 10/2005 | Vaidyanathan et al. | |
| 2007/0003650 A1 | 1/2007 | Schroeder | |
| 2007/0228592 A1 | 10/2007 | Dunn et al. | |
| 2008/0176092 A1 | 7/2008 | Owens | |
| 2009/0095410 A1 * | 4/2009 | Oldani | B29C 70/382 156/189 |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 * | 3/2014 | Tyler | B29C 64/209 264/401 |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0136455 A1 | 5/2015 | Fleming | |
| 2016/0009029 A1 * | 1/2016 | Cohen | B29C 64/264 264/493 |
| 2016/0012935 A1 | 1/2016 | Rothfuss | |
| 2016/0031155 A1 | 2/2016 | Tyler | |
| 2016/0046082 A1 * | 2/2016 | Fuerstenberg | B29C 70/021 264/480 |
| 2016/0052208 A1 | 2/2016 | Debora et al. | |
| 2016/0082641 A1 * | 3/2016 | Bogucki | B33Y 10/00 427/422 |
| 2016/0082659 A1 | 3/2016 | Hickman et al. | |
| 2016/0107379 A1 | 4/2016 | Mark et al. | |
| 2016/0114532 A1 | 4/2016 | Schirtzinger et al. | |
| 2016/0136885 A1 | 5/2016 | Nielsen-Cole et al. | |
| 2016/0144565 A1 | 5/2016 | Mark et al. | |
| 2016/0144566 A1 | 5/2016 | Mark et al. | |
| 2016/0192741 A1 | 7/2016 | Mark | |
| 2016/0200047 A1 | 7/2016 | Mark et al. | |
| 2016/0243762 A1 | 8/2016 | Fleming et al. | |
| 2016/0263806 A1 * | 9/2016 | Gardiner | B28B 1/001 |
| 2016/0263822 A1 | 9/2016 | Boyd | |
| 2016/0263823 A1 | 9/2016 | Espiau et al. | |
| 2016/0271876 A1 | 9/2016 | Lower | |
| 2016/0297104 A1 | 10/2016 | Guillemette et al. | |

(56) References Cited

U.S. PATENT DOCUMENTS

| | | |
|---|---|---|
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1* | 3/2017 | Waldrop, III ........... B29C 70/30 |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0217113 A1* | 8/2017 | Villeneuve ......... B29D 30/0606 |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

International Search Report dated Oct. 24, 2017 for PCT/US17/46043 to CC3D LLC Filed Aug. 9, 2017.

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Oct. 13, 2016 for PCT/US2016/042906 to CC3D LLC Filed Jul. 19, 2016.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schierner, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T.M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

(56) References Cited

OTHER PUBLICATIONS

Vincent J. Lopata et al., Electron-Beam-Curable Epoxy Resins for the Manufacture of High-Performance Composites, Radiation Physics and Chemistry, vol. 56, pp. 405-415 (1999).
Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

ADDITIVE MANUFACTURING SYSTEM HAVING MULTI-CHANNEL NOZZLE

RELATED APPLICATIONS

This application is based on and claims the benefit of priority from U.S. Provisional Application No. 62/383,801 that was filed on Sep. 6, 2016, the contents of all of which are expressly incorporated herein by reference.

TECHNICAL FIELD

The present disclosure relates generally to a manufacturing system and, more particularly, to an additive manufacturing system having a multi-channel nozzle.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) required for some applications. In addition, during conventional multi-fiber pultrusion, ensuring adequate wetting and bonding between adjacent fibers can be problematic.

The disclosed system is directed to addressing one or more of the problems set forth above and/or other problems of the prior art.

SUMMARY

In one aspect, the present disclosure is directed to a nozzle for a head of an additive manufacturing system. The nozzle may include a housing, and a fiber guide located inside the housing and configured to separately receive a plurality of continuous reinforcements. The head may also include a die located inside the housing and configured to receive the plurality of continuous reinforcements from the fiber guide and to cause the plurality of continuous reinforcements to converge.

In another aspect, the present disclosure is directed to a head for an additive manufacturing system. The head may include a matrix reservoir, and a fiber guide configured to separately receive a plurality of matrix-wetted reinforcements from the matrix reservoir. The head may also include a die configured to receive the plurality of matrix-wetted reinforcements from the fiber guide and to cause the plurality of matrix-wetted reinforcements to converge.

In yet another aspect, the present disclosure is directed to an additive manufacturing system. The additive manufacturing system may include a matrix reservoir, and a fiber guide configured to separately receive a plurality of matrix-wetted reinforcements from the matrix reservoir. The additive manufacturing system may also include a die configured to receive the plurality of matrix-wetted reinforcements from the fiber guide and to cause the plurality of matrix-wetted reinforcements to converge into a ribbon. The additive manufacturing system may additionally include a cure enhancer configured to cure the matrix in the composite material during discharge of the ribbon from the die, and a support configured to move the die in multiple dimensions during discharge of the ribbon.

DETAILED DESCRIPTION

Figure 1:
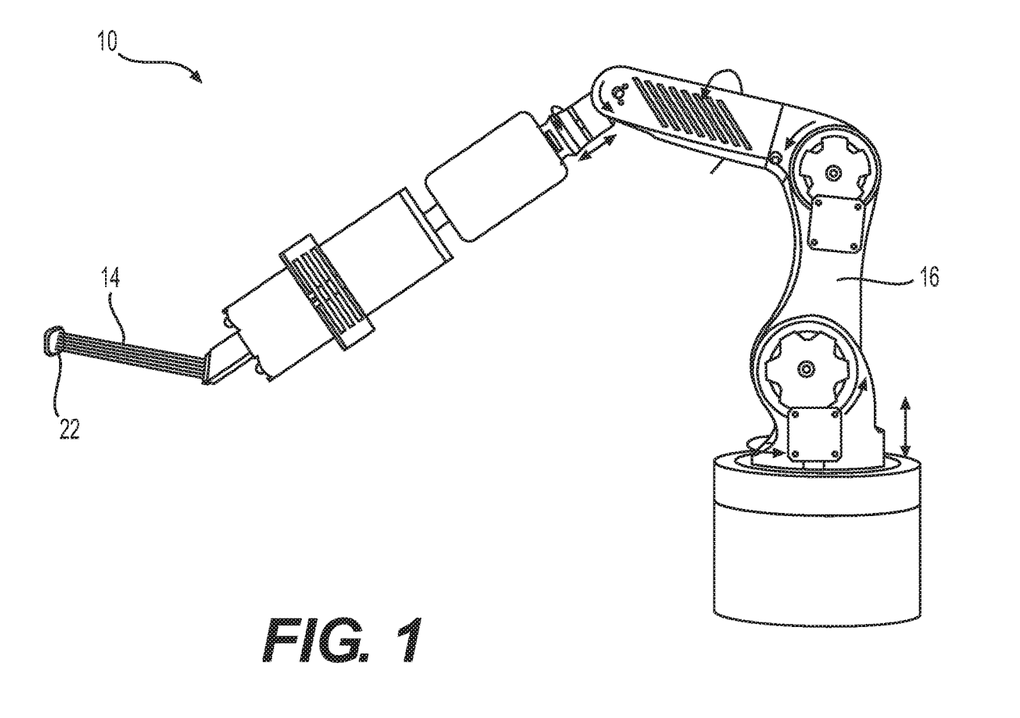
FIGS. 1 and 2 are diagrammatic illustrations of exemplary disclosed manufacturing systems.
Figure 2:
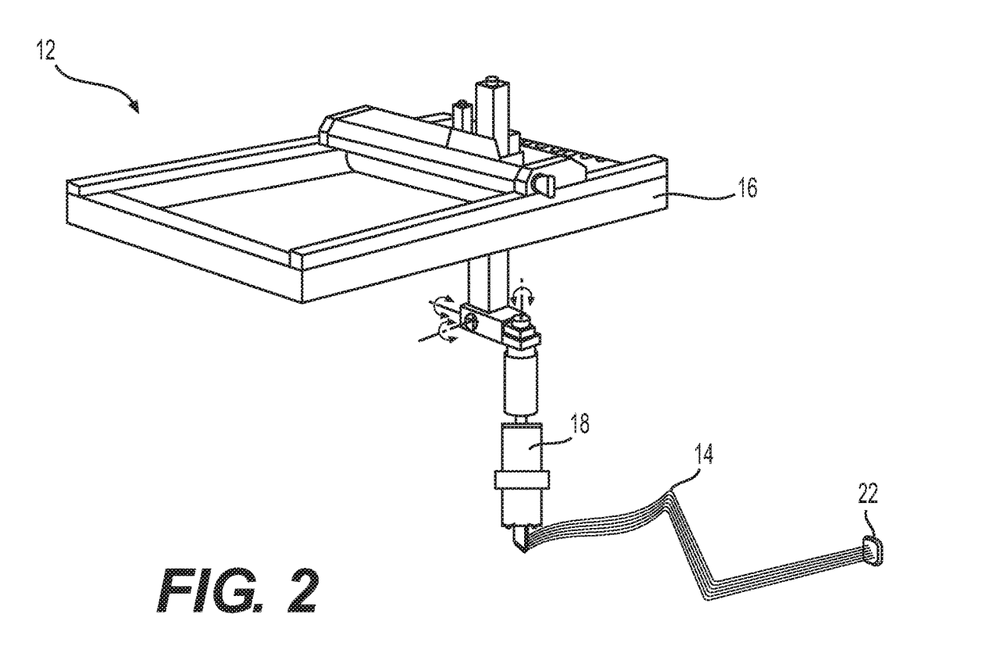

FIGS. 1 and 2 illustrate different exemplary systems 10 and 12, which may be used to continuously manufacture composite structures 14 having any desired cross-sectional shape (e.g., circular, polygonal, etc.). Each of systems 10, 12 may include at least a support 16 and a head 18. Head 18 may be coupled to and moved by support 16. In the disclosed embodiment of FIG. 1, support 16 is a robotic arm capable of moving head 18 in multiple directions during fabrication of structure 14, such that a resulting longitudinal axis of structure 14 is three-dimensional. In the embodiment of FIG. 2, support 16 is an overhead gantry also capable of moving head 18 in multiple directions during fabrication of structure 14. Although supports 16 of both embodiments are shown as being capable of 6-axis movements, it is contemplated that any other type of support 16 capable of moving head 18 in the same or in a different manner could also be utilized, if desired. In some embodiments, a drive may mechanically couple head 18 to support 16, and may include components that cooperate to move and/or supply power or materials to head 18.

Head 18 may be configured to receive or otherwise contain a matrix material. The matrix material may include any type of matrix material (e.g., a liquid resin, such as a zero volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 18 may be pressurized, for example by an external device (e.g., an extruder or another type of pump—not shown) that is fluidly connected to head 18 via a corresponding conduit (not shown). In another embodiment, however, the pressure may be generated completely inside of head 18 by a similar type of device. In yet other embodiments, the matrix material may be gravity-fed through and/or mixed within head 18. In some instances, the matrix material inside head 18 may need to be kept cool and/or dark to inhibit premature curing; while in other instances, the matrix material may need to be kept warm for the same reason. In either situation, head 18 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 14. The reinforcements may be stored within (e.g., on separate internal spools—not shown) or otherwise passed through head 18 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials at least partially encased in the matrix material discharging from head 18.

The reinforcements may be exposed to (e.g., coated with) the matrix material while the reinforcements are inside head 18, while the reinforcements are being passed to head 18, and/or while the reinforcements are discharging from head 18, as desired. The matrix material, dry reinforcements, and/or reinforcements that are already exposed to the matrix material (e.g., wetted reinforcements) may be transported into head 18 in any manner apparent to one skilled in the art.

One or more cure enhancers (e.g., a UV light, an ultrasonic emitter, a laser, a heater, a catalyst dispenser, etc.) 20 may be mounted proximate (e.g., within or on) head 18 and configured to enhance a cure rate and/or quality of the matrix material as it is discharged from head 18. Cure enhancer 20 may be controlled to selectively expose surfaces of structure 14 to energy (e.g., UV light, electromagnetic radiation, vibrations, heat, a chemical catalyst, etc.) during the formation of structure 14. The energy may increase a rate of chemical reaction occurring within the matrix material, sinter the material, harden the material, or otherwise cause the material to cure as it discharges from head 18. In the depicted embodiments, cure enhancer 20 includes multiple LEDs (e.g., 6 different LEDs) that are equally distributed about a center axis of head 18. However, it is contemplated that any number of LEDs or other energy sources could alternatively be utilized for the disclosed purposes and/or arranged in another manner (e.g., unequally distributed, arranged in a row, etc.). For example, the primary and/or auxiliary cure enhancers 20 could be located on an arm (not shown) that trails behind head 18, if desired. The amount of energy produced by cure enhancer 20 may be sufficient to cure the matrix material before structure 14 axially grows more than a predetermined length away from head 18. In one embodiment, structure 14 is completely cured before the axial growth length becomes equal to an external diameter of the matrix-coated reinforcement.

The matrix material and reinforcement may be discharged from head 18 via at least two different modes of operation. In a first mode of operation, the matrix material and reinforcement are extruded (e.g., pushed under pressure and/or mechanical force) from head 18, as head 18 is moved by support 16 to create the 3-dimensional shape of structure 14. In a second mode of operation, at least the reinforcement is pulled from head 18, such that a tensile stress is created in the reinforcement during discharge. In this mode of operation, the matrix material may cling to the reinforcement and thereby also be pulled from head 18 along with the reinforcement, and/or the matrix material may be discharged from head 18 under pressure along with the pulled reinforcement. In the second mode of operation, where the matrix material is being pulled from head 18, the resulting tension in the reinforcement may increase a strength of structure 14, while also allowing for a greater length of unsupported material to have a straighter trajectory (i.e., the tension may act against the force of gravity to provide free-standing support for structure 14).

The reinforcement may be pulled from head 18 as a result of head 18 moving away from an anchor point 22. In particular, at the start of structure-formation, a length of matrix-impregnated reinforcement may be pulled and/or pushed from head 18, deposited onto an anchor point 22, and cured, such that the discharged material adheres to anchor point 22. Thereafter, head 18 may be moved away from anchor point 22, and the relative movement may cause the reinforcement to be pulled from head 18. It should be noted that the movement of reinforcement through head 18 could be assisted (e.g., via internal feed mechanisms), if desired. However, the discharge rate of reinforcement from head 18 may primarily be the result of relative movement between head 18 and anchor point 22, such that tension is created within the reinforcement. It is contemplated that anchor point 22 could be moved away from head 18 instead of or in addition to head 18 being moved away from anchor point 22.

Figure 3:
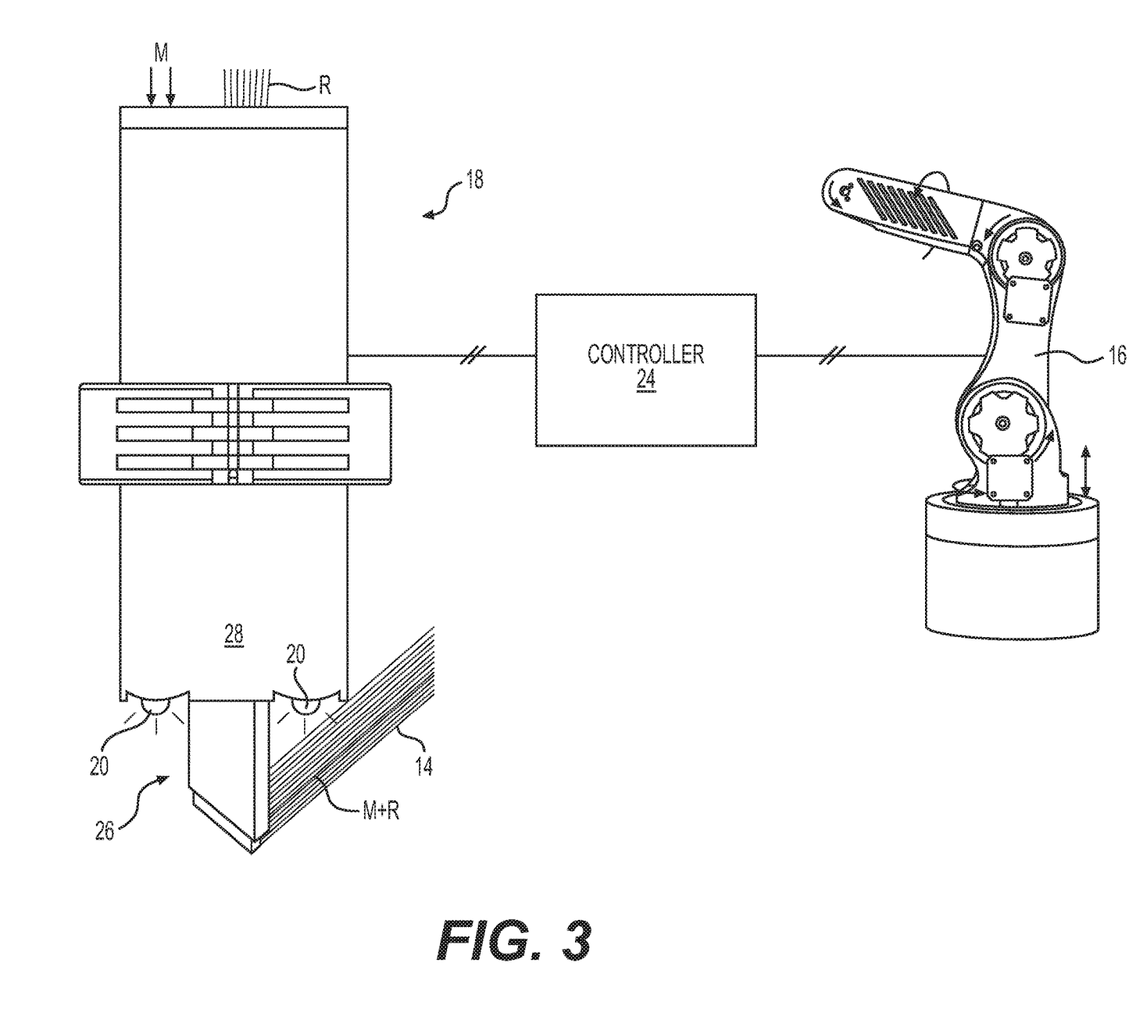
FIG. 3 is a diagrammatic illustration of an exemplary disclosed control arrangement that may be utilized with the manufacturing systems of FIGS. 1 and 3.

An exemplary control arrangement is shown in FIG. 3 that may be used to regulate operation of system 10 and/or 12 (referring to FIG. 1). As can be seen in this figure, a controller 24 is provided and shown as being communicatively coupled with support 16, head 18, and any number and type of cure enhancers 20. Controller 24 may embody a single processor or multiple processors that include a means for controlling an operation of system(s) 10 and/or 12. Controller 24 may include one or more general- or special-purpose processors or microprocessors. Controller 24 may further include or be associated with a memory for storing data such as, for example, design limits, performance characteristics, operational instructions, matrix characteristics, reinforcement characteristics, characteristics of structure 14, and corresponding parameters of each component of system(s) 10 and/or 12. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system(s) 10 and/or 12 via wired and/or wireless transmission.

One or more maps may be stored in the memory of controller 24 and used during fabrication of structure 14. Each of these maps may include a collection of data in the form of lookup tables, graphs, and/or equations. In the disclosed embodiment, the maps are used by controller 24 to determine desired characteristics of cure enhancers 20, the associated matrix (represented by M in FIG. 3), and/or the associated reinforcements (represented by R in FIG. 3) at different locations within structure 14. The characteristics may include, among others, a type, quantity, and/or configuration of reinforcement to be discharged at a particular location within structure 14. Controller 24 may then correlate operation of support 16 (e.g., the location and/or orientation of head 18) and/or the discharge of material from head 18 (a type of material, desired performance of the material, cross-linking requirements of the material, a discharge rate, etc.) with the operation of cure enhancers 20 such that structure 14 is produced in a desired manner.

Head 18 is shown in FIG. 3 as having a nozzle 26, through which matrix-wetted reinforcements are discharged. In one example, nozzle 26 is located at a lower end of a matrix reservoir 28, and at least partially surrounded by cure enhancements 20. The reinforcements may be received at an opposing upper end of reservoir 28, pass axially through reservoir 28 where at least some matrix-impregnation occurs, and be discharged from head 18 via nozzle 26.

Figure 4:
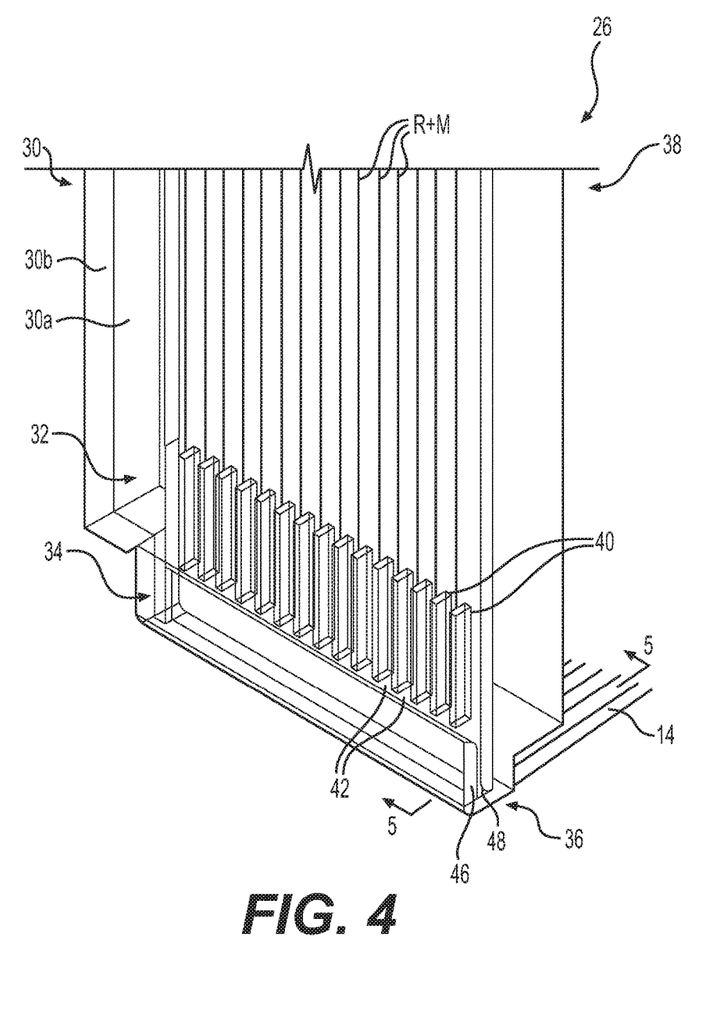
FIGS. 4 and 5 are perspective and cross-sectional illustrations, respectively, of an exemplary disclosed nozzle that may be used in conjunction with the manufacturing systems of FIGS. 1 and 2.
Figure 5:
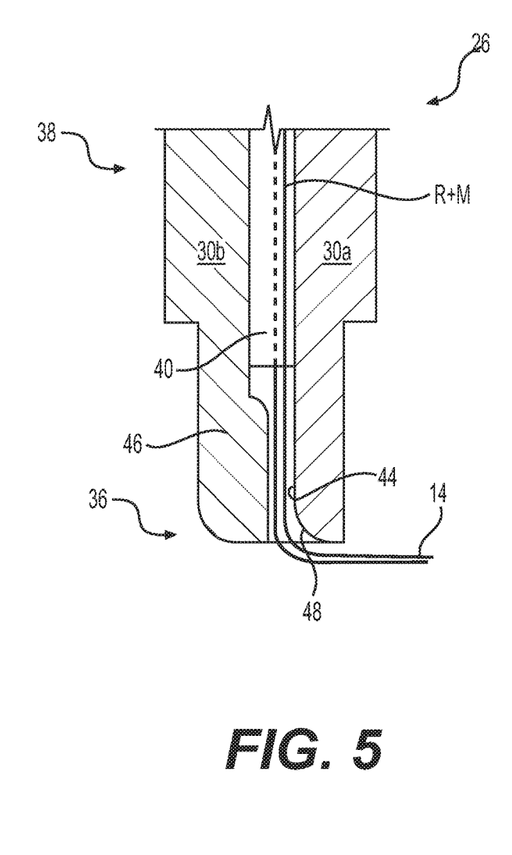

As shown in FIGS. 4 and 5, nozzle 26 may be an assembly of multiple components. These components may include, among other things, a housing 30, a fiber guide 32 located inside housing 30, and a die 34 located downstream of fiber guide 32 (e.g., downstream relative to a movement direction of reinforcements through head 18). It is contemplated that fiber guide 32 and die 34 may be separate features of a common component, or separate components that are operatively connected to each other.

Housing 30 may be tubular, spherical, or cuboid, and have a discharge end 36 and an opposing supply end 38. In the disclosed embodiment, housing 30 is a two-part component, including a base 30a and a cover 30b that is removably attached to base 30a. This arrangement may simplify threading of nozzle 26 with reinforcements R at a start of a manufacturing event, for example by providing internal access to fiber guide 38. It should be noted that base 30a and/or cover 30b could have any desired shape and size, and that cover 30b could be larger or smaller than base 30a. For example, cover 30b could wrap around or otherwise at least partially encircle base 30a in some embodiments. It is contemplated that one or both of base 30a and cover 30b may be coated with a friction-reducing material (e.g., Teflon™, nylon, etc.), if desired. Matrix material M and reinforcements R may enter housing 30 together at supply end 38, pass through fiber guide 32, and then exit housing 30 via die 34 at discharge end 36.

Fiber guide 32 may include a plurality of dividers 40 that are configured to separate fiber guide 32 into multiple adjacent channels 42. Each channel 42 may be configured to separately receive one or more reinforcements R. In one embodiment, dividers 40 are elongated protrusions or walls having lengths that are generally aligned with a flow direction of reinforcements R through head 18. In another embodiment, dividers 40 are simply spaces between adjacent axial holes formed within fiber guide 32. In either embodiment, dividers 40 may be integral with or otherwise connected to housing 30 (e.g., integral with base 30a). Other divider configurations (e.g., standalone divider inserts) may also be possible. It should be noted that, although dividers 40 are shown in FIG. 4 as being generally arranged in a straight line, dividers 40 could alternatively be arranged in an arc, a circle, a box, or another shape. Reinforcements R may be coated with matrix material M during passage through matrix reservoir 28, or via another mechanism (e.g., via jetting or pre-impregnation) prior to entering fiber guide 32.

Die 34 may be located at discharge end 36 of nozzle 26 and downstream of fiber guide 32. Die 34 may have any desired cross-sectional shape (e.g., a rectangular shape, a circular shape, an ellipsoid shape, or another suitable shape), with one or more axial passages 44 (only one shown in FIGS. 4 and 5) that are configured to receive wetted reinforcements from fiber guide 32. A number of axial passages 44 within die 34 (and/or a combined cross-sectional area of passages 44) may be less than a number (and/or combined cross-sectional area) of channels 42 inside fiber guide 32, such that the wetted reinforcements received from passages 44 are caused to converge. In one embodiment, a wedge-like protrusion 46 may extend from cover 30b at die 34 in a transverse direction toward base 30b, such that a cross-section of nozzle 26 converges at die 34. With this arrangement, the reduced number passages 44 and/or the converging cross-sectional area within die 34 may function as funnels and/or aggregators, allowing the wetted reinforcements R received from fiber guide 32 to be pressed together (e.g., into a ribbon) prior to discharge and curing. A vertical (i.e., vertical relative to the perspective of FIG. 3) dimension of die 34 may be sufficient to allow the reinforcements R to bond somewhat prior to curing, without adding significant friction to the movement of the reinforcements R through head 18. Passages 44 may be convergent along their length in a single dimension (e.g., in the left-right dimension shown in FIG. 5) or in multiple dimensions (e.g., in the left-right dimension and in the front-to-back dimension shown in FIG. 5), as desired.

An outlet of die 34 may have a rounded trailing edge 48. The curvature of edge 48 may reduce a likelihood of reinforcements R bending through too sharp of an angle that causes breakage during discharge. In some embodiments, head 18 may be spaced apart from a print bed (not shown), anchor point 22, and/or a previously fabricated layer of structure 14 by an amount that causes rounded edge 48 to press downward on the discharging material, thereby compressing overlapping layers and/or urging adjacent tracks of material together.

INDUSTRIAL APPLICABILITY

The disclosed systems may be used to continuously manufacture composite structures having any desired cross-sectional shape, length, density, and/or strength. The composite structures may include any number of different reinforcements of the same or different types, diameters, shapes, configurations, and consists, each coated with a common matrix material. In addition, the disclosed head may allow for the simultaneous use of separate reinforcements that are at least partially bonded together prior to discharged. The use of separate reinforcements may allow for more thorough wetting inside of the head and/or for multi-functional applications, while the bonding facilitated inside of the head may allow for greater compaction and strength between the reinforcements. Operation of systems 10 and 12 will now be described in detail.

At a start of a manufacturing event, information regarding a desired structure 14 may be loaded into systems 10 and 12 (e.g., into controller 24 that is responsible for regulating operations of support 16 and/or head 18). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, location-specific matrix stipulations, location-specific reinforcement stipulations, etc. It should be noted that this information may alternatively or additionally be loaded into systems 10 and 12 at different times and/or continuously during the manufacturing event, if desired. Based on the component information, one or more different reinforcements and/or matrix materials may be selectively installed and/or continuously supplied into systems 10 and 12.

Installation of the reinforcements may be performed by first removing cover 30a (referring to FIGS. 4 and 5) from base 30b of housing 30, thereby exposing channels 42 of fiber guide 38. The reinforcements may then be passed down through matrix reservoir 28, and then separately threaded through particular channels 42 formed by adjacent dividers 40. Thereafter, cover 30a may be re-engaged with base 30b. Installation of the matrix material may include filling head 18 and/or coupling of an extruder (not shown) to head 18.

Head 18 may then be moved by support 16 under the regulation of controller 24 to cause matrix-coated reinforcements to be placed against or on a corresponding anchor point 22. Cure enhancers 20 may then be selectively activated to cause hardening of the matrix material surrounding the reinforcements, thereby bonding the reinforcements to anchor point 22.

The component information may then be used to control operation of systems 10 and 12. For example, the reinforcements may be pulled and/or pushed from head 18 (along with the matrix material), while support 16 selectively moves head 18 in a desired manner during curing, such that an axis of the resulting structure 14 follows a desired trajectory (e.g., a free-space, unsupported, 3-D trajectory). As the separate reinforcements are pulled through head 18, the reinforcements may be directed via channels 42 into die 34, allowing die 34 to funnel the reinforcements into a compressed shape (e.g., into a ribbon of axially aligned reinforcements arranged in a line adjacent each other). It should be noted that the use of channels 42 may facilitate turning of head 18 and a resulting complex trajectory, with reduced bunching of reinforcements inside of head 18 caused by the turning. Once structure 14 has grown to a desired length, structure 14 may be disconnected (e.g., severed) from head 18 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A nozzle for a head of an additive manufacturing system, comprising:
   a housing;
   a fiber guide configured to receive a plurality of continuous reinforcements, the fiber guide being located inside the housing and including a plurality of channels that extend along a length of the housing and the plurality of continuous reinforcements and separate the plurality of continuous reinforcements from each other; and
   a die located inside the housing at outlets of the plurality of channels, the die having a cross-sectional area less than a combined cross-sectional area of the plurality of channels to receive the plurality of continuous reinforcements from the fiber guide and to cause the plurality of continuous reinforcements to converge into a ribbon, wherein
   the fiber guide includes a plurality of protrusions that separate the plurality of channels.

2. The nozzle of claim 1, wherein the cover housing includes an integral protrusion having a tapered upstream end and a downstream end that extends transversely toward the plurality of protrusions.

3. The nozzle of claim 1, wherein the die includes a reduced number of channels compared to the fiber guide.

4. The nozzle of claim 1, wherein the die has a rounded trailing edge at an end opposite the fiber guide.

5. The nozzle of claim 1, wherein at least one of the fiber guide and the die includes an internal coating of a reduced friction material.

6. A head for an additive manufacturing system, comprising:
   a matrix reservoir;
   a fiber guide configured to receive a plurality of matrix-wetted reinforcements from the matrix reservoir, the fiber guide including a plurality of channels that extend along a length of the plurality of matrix-wetted reinforcements and separate the plurality of matrix-wetted reinforcements from each other; and
   a die configured to receive the plurality of matrix-wetted reinforcements from the fiber guide and to cause the plurality of matrix-wetted reinforcements to converge.

7. The head of claim 6, further including a cure enhancer configured to expose the plurality of matrix-wetted reinforcements discharging from the die to energy and increase a rate of chemical reaction occurring within the plurality of matrix-wetted reinforcements.

8. The head of claim 6, wherein:
   the fiber guide includes a plurality of protrusions that separate the plurality of axially oriented channels; and
   the head includes a nozzle housing having:
      a base that is integral with the plurality of protrusions; and
      a cover that is removable from the base to provide access to the plurality of axially oriented channels.

9. The head of claim 8, wherein the cover includes an integral protrusion having a tapered upstream end and a downstream end that extends transversely toward the plurality of protrusions.

10. The head of claim 6, wherein the die includes a reduced number of channels compared to the fiber guide.

11. The head of claim 6, wherein the die has a rounded trailing edge.

12. The head of claim 6, wherein at least one of the fiber guide and the die includes an internal coating of a reduced friction material.

13. An additive manufacturing system, comprising:
   a matrix reservoir;
   a fiber guide configured to receive a plurality of matrix-wetted reinforcements from the matrix reservoir and maintain a separation between the plurality of matrix-wetted reinforcements;
   a die configured to receive the plurality of matrix-wetted reinforcements from the fiber guide and to cause the plurality of matrix-wetted reinforcements to converge into a ribbon;
   a cure enhancer configured to cure matrix in the ribbon during discharge of the ribbon from the die; and
   a support configured to move the die in multiple dimensions during discharge of the ribbon.

14. The additive manufacturing system of claim 13, wherein the fiber guide includes a plurality of channels that extend along a length of the plurality of matrix-wetted reinforcements and are separated by a plurality of protrusions.

15. The additive manufacturing system of claim 14, further including a housing configured to house at least the fiber guide, the housing having:
- a base that is integral with the plurality of protrusions; and
- a cover that is removable from the base to provide access to the plurality of axially oriented channels.

16. The additive manufacturing system of claim 15, wherein the cover includes an integral protrusion that extends transversely toward the plurality of protrusions to reduce a cross-sectional area of the die.

17. The additive manufacturing system of claim 13, wherein the die includes:
- a reduced number of channels compared to the fiber guide; and
- a rounded trailing edge at an end opposite the fiber guide.

* * * * *